United States Patent [19]

Thuries et al.

[11] 4,342,067

[45] Jul. 27, 1982

[54] ELECTRIC POWER SUBSTATION FOR USE AT VERY HIGH VOLTAGES

[75] Inventors: Edmond Thuries, Meyzieu; Jean-Paul Masson, Villeurbanne, both of France

[73] Assignee: Societe Anonyme dite: Delle-Alsthom, Villeurbanne, France

[21] Appl. No.: 118,718

[22] Filed: Feb. 5, 1980

[30] Foreign Application Priority Data

Feb. 7, 1979 [FR] France ............................... 79 03079

[51] Int. Cl.³ .............................................. H02B 1/04
[52] U.S. Cl. ..................................... 361/333; 361/341
[58] Field of Search ............... 361/333, 331, 332, 334, 361/335, 341, 342; 200/148 B, 148 R, 148 G, 48 R, 144 R; 174/71 B, 72 B, 99 B

[56] References Cited

U.S. PATENT DOCUMENTS

| | | | |
|---|---|---|---|
| 3,364,398 | 1/1968 | Oishi | 361/333 |
| 4,032,820 | 6/1977 | Oishi | 361/333 |
| 4,237,520 | 12/1980 | Oishi | 361/333 |

FOREIGN PATENT DOCUMENTS 1053711 2/1954 France.
1103516 11/1955 France.
1359780 3/1964 France.

*Primary Examiner*—Gerald P. Tolin
*Attorney, Agent, or Firm*—Sughrue, Mion, Zinn, Macpeak & Seas

[57] ABSTRACT

The invention concerns an electric power substation for use at very high voltages.

The substation comprises a circuit-breaker (4) connected to a busbar (29) by a vertical isolating switch (15), the projection (31) on the floor plane (1) of the live components (19) of the isolating switch not intersecting that (34) of the circuit-breaker and lying wholly within a circle whose diameter is less than thirty percent of the opening distance (32) of the isolating switch, said components being for the most part located above the circuit-breaker.

Application to substations for use at voltages of 245 kilovolts and above.

10 Claims, 6 Drawing Figures

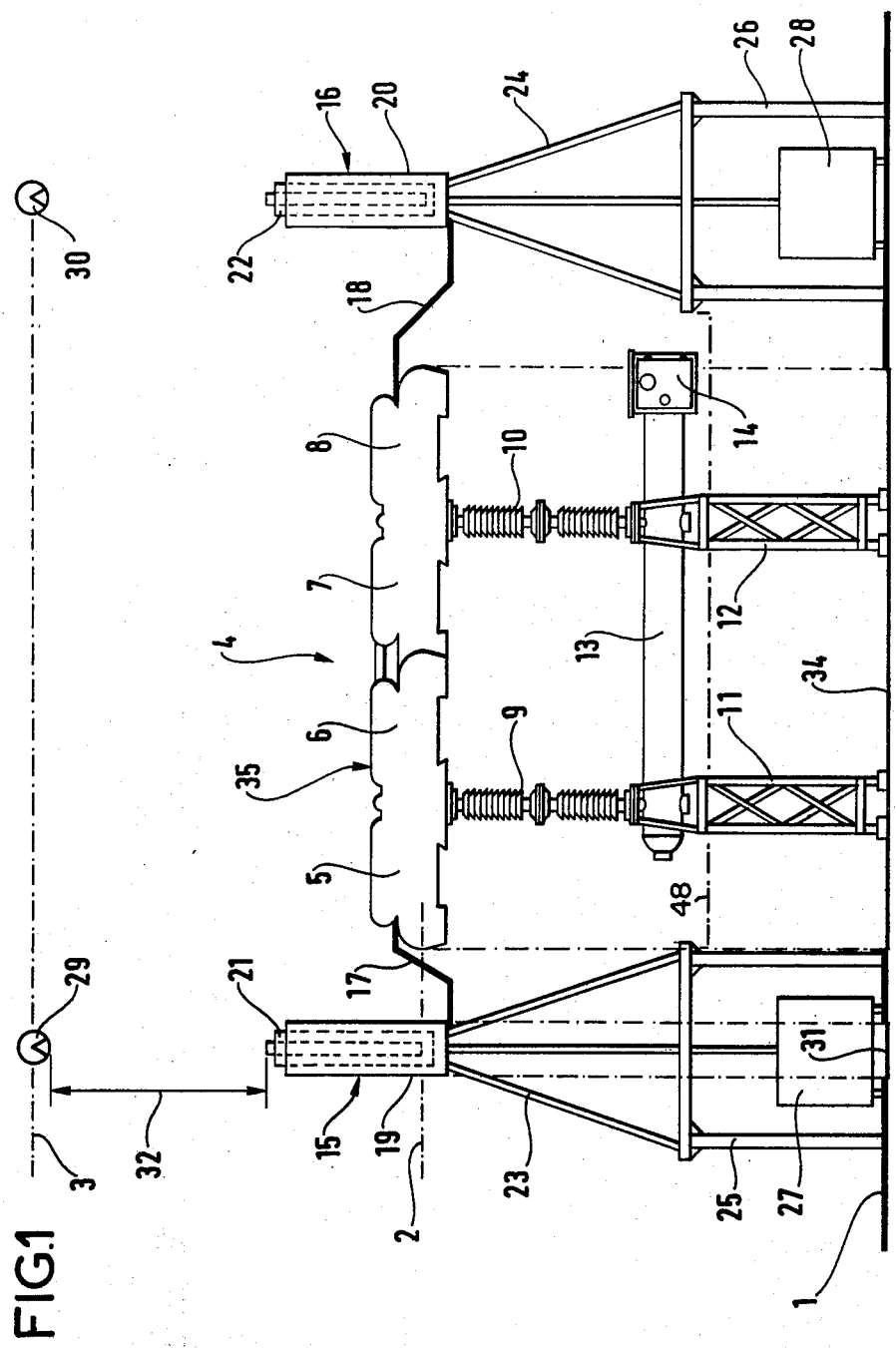

ELECTRIC POWER SUBSTATION FOR USE AT VERY HIGH VOLTAGES

The present invention concerns an electric power substation for use at very high voltages of 245 kilovolts and above.

BACKGROUND OF THE INVENTION

Electric power substations for use at very high voltages occupy a large space on the ground as a result of the large separation required between live components of units such as power transformers, circuit-breakers, isolating switches and busbars.

To provide an adequate level of flexibility in operation, more units must be included in the substation than the strict minimum requirement or other measures must be taken which also tend to increase the area occupied by the substation. For example, to enable circuit-breakers to be serviced without interrupting the distribution of electric power, certain types of substation comprise three circuit-breakers per pair of line outlets (the so-called "one and a half circuit-breaker" configuration). Other types of substation comprise circuit-breakers connected to two sets of busbars. A third set of "transfer" busbars is provided to compensate for failure of any circuit-breaker. Also known are so-called ring or loop installations in which a significant area is wasted inside the ring or loop.

To provide maintenance personnel with safe access to the circuit-breakers it is necessary to provide around each circuit-breaker a region wherein access to the circuit-breaker is protected against the effects of the very high voltage. This further increases the area on the ground occupied by a very high voltage electric power substation.

It is known to reduce the size of electric power substations for use at very high voltages by using smaller equipment housed in sealed metal enclosures filled with an insulating gas. This solution significantly increases costs, however.

Another known method of reducing the area on the ground is to use a multilevel arrangement, with three levels, for example. The first level is the floor plane. The circuit-breakers are in the second level which is above the floor plane. Vertical isolating switches are also placed on the second level with the busbars on the third level. The isolating switches are fitted with articulated arms in a pantograph configuration. When the isolating switch is open-circuit, the arms are folded in a vertical plane and their vertical projection onto the floor plane extends a significant distance beyond the perimeter of the isolating switch proper. As these arms may be live even when the isolating switch is open-circuit, the use of this type of isolating switch means that the distance between the busbars must be increased, as it is not always possible to arrange the isolating switches such that the vertical plane containing the folding arms is parallel to the busbars.

The present invention is intended to provide an electric power substation for use at very high voltages occupying a surface area on the ground which is less than in the case of the prior art substations referred to above.

SUMMARY OF THE INVENTION

The present invention consists in an electric power substation for use at very high voltages of 245 kilovolts and above, comprising at least one circuit-breaker connected to a conductive busbar by at least one vertical isolating switch, characterised in that the geometric vertical projection onto the horizontal floor plane of the substation of the components of the isolating switch connectable to the very high voltage is within a circle whose diameter is less than thirty percent of the opening distance of the isolating switch and which does not intersect the vertical geometric projection of the circuit-breaker onto the horizontal floor plane of the substation, the components of the isolating switch being for the most part located above the circuit-breaker so as to provide a region wherein access to the circuit-breaker is protected against the effects of the very high voltage.

BRIEF DESCRIPTION OF THE DRAWINGS

Specific embodiments of an electric power substation in accordance with the invention will now be described, by way of example only and with reference to the accompanying drawings.

FIG. 1 is a partial schematic elevation of one embodiment of an electric power substation according to the invention.

DESCRIPTION OF PREFERRED EMBODIMENTS

Figure 3:
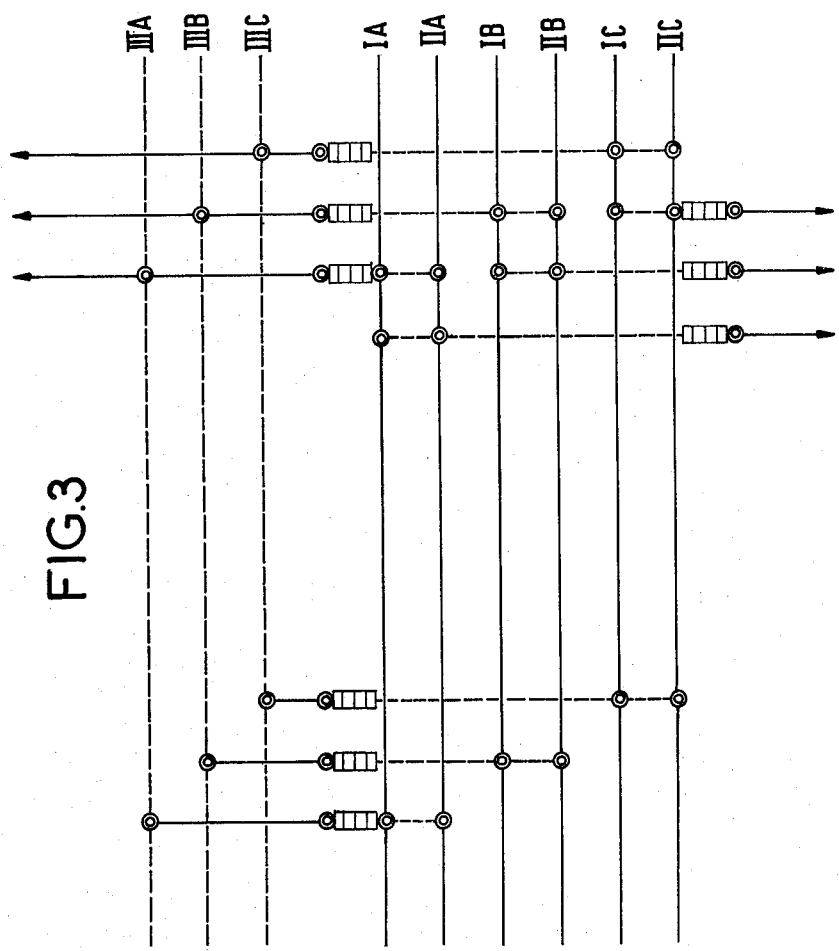
FIG. 3 is a schematic of an electric power substation according to the invention with two sets of main busbars and a set of transfer busbars.

FIG. 1 is a view of a portion of an electric power substation for use at very high voltages arranged in three levels numbered 1, 2 and 3. Level 1 is the floor plane. In level 2, above level 1, is a circuit-breaker 4 comprising four series-connected switching sections 5, 6, 7 and 8 supported on insulators 9 and 10 mounted on metal frameworks 11 and 12 resting on the floor plane 1. Between the frameworks 11 and 12 and supports 9 and 10 is a horizontally arranged compressed air reservoir 13 feeding the switching sections of the circuit-breaker 4. A control cubicle 14 is attached to one end of the reservoir 13.

At the second level 2, and on either side of the circuit-breaker 4, are two vertical axis isolating switches 15 and 16, preferably of the telescopic type as shown in the figure. These are connected in series with the switching sections of the circuit-breaker 4 by connections 17 and 18 in level 2. Each isolating switch comprises a metal enclosure 19, 20 housing a mechanism for actuating a vertically telescopic tube 21, 22. The isolating switches 15 and 16 are mounted on respective insulating supports 23 and 24, which may be of the tripod type shown in the figure. These supports are mounted on metal frameworks 25, 26 resting on the floor plane 1, each enclosing a cabinet (27, 28) containing the isolating switch control system.

Vertically above tubes 21 and 22 of the isolating switches 15 and 16 are respective conducting busbars 29 and 30, extending horizontally at the third level 3.

The separation between the circuit-breaker and the isolating switches may be less than that shown in the figure, in which case the independent metal frameworks 11, 12, 25 and 26 may be combined to form a single framework, as indicated by dotted lines 48, FIG. 1.

According to the invention, the geometric vertical projection 31 on the floor plane 1 of the components such as 19 of at least one isolating switch 15 connectable to the very high voltage is within a circle whose diameter is less than thirty percent of the opening distance 32 of the isolating switch; moreover, this vertical projection 31 does not intersect the geometric vertical projection 34 on the floor plane 1 of the circuit-breaker 4. Finally, the components 19 are for the most part located above the switching sections 5 to 8 of the circuit-breaker 4.

In the arrangement shown in the figure, in which the two isolating switches 15 and 16 are open-circuit, once the circuit-breaker 4 has been open-circuited a region 35 located immediately above the circuit-breaker 4 is accessible to maintenance personnel. This region is protected against the effects of the very high voltage even if the conductive busbars 29 and 30 are live. This benefit is accompanied by a significant reduction in the surface area on the ground as compared with substations using pantograph-type isolating switches. The vertical projection of the isolating switch in the substation according to the invention is particularly small.

FIGS. 2 to 6 are schematics of electric power substations according to the invention. In these figures, the full lines represent conductors located at the highest level (level 3 in FIG. 1). The dashed lines represent conductors in the next lower level (level 2 in FIG. 1). The double circles represent telescopic type vertical isolating switches and the rectangles represent the switching section of the circuit-breakers. A single circle represents the transition of a conductor from one level to another other than via an isolating switch.

Figure 2:
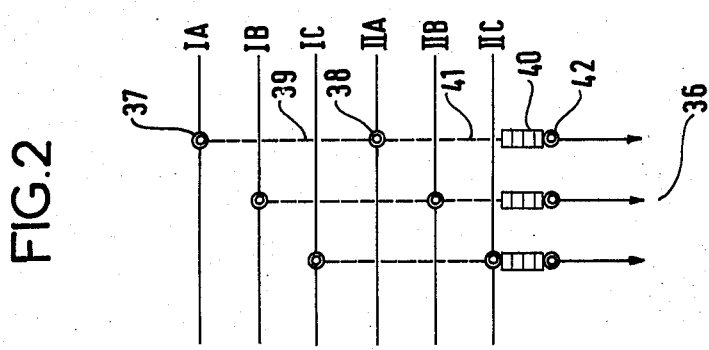
FIG. 2 is a schematic view of a portion of an electric power substation according to the invention with two sets of busbars.

FIG. 2 shows two parallel sets of three-phase busbars $I_A$, $I_B$, $I_C$ and $II_A$, $II_B$, $II_C$. A three-phase branch connection perpendicular to the busbars and comprising, connected in series, two isolating switches, one circuit-breaker and a further isolating switch connects one or both sets of busbars to an outlet 36. Note that both sets of busbars are at the higher level. Beneath conductor $I_A$, for example, is a vertical isolating switch 37 connected by a connection 39 at the lower level to an isolating switch 38 beneath busbar $II_A$. The bottom terminal of the isolating switch 38 is connected to one terminal of a circuit-breaker 40 by means of a connection at the lower level. An isolating switch 42 at the lower end connected to the other terminal of the circuit-breaker 40 is also connected to the outlet 36. This arrangement provides for a crossover at different levels of the conductors of the branch connection and of the set of busbars.

FIG. 3 shows two interleaved sets of busbars $I_A$, $I_B$, $I_C$ and $II_A$, $II_B$, $II_C$ and a set of transfer busbars $III_A$, $III_B$, $III_C$. While the two sets of main busbars are at the higher level, the set of transfer busbars is at the lower level.

Figure 4:
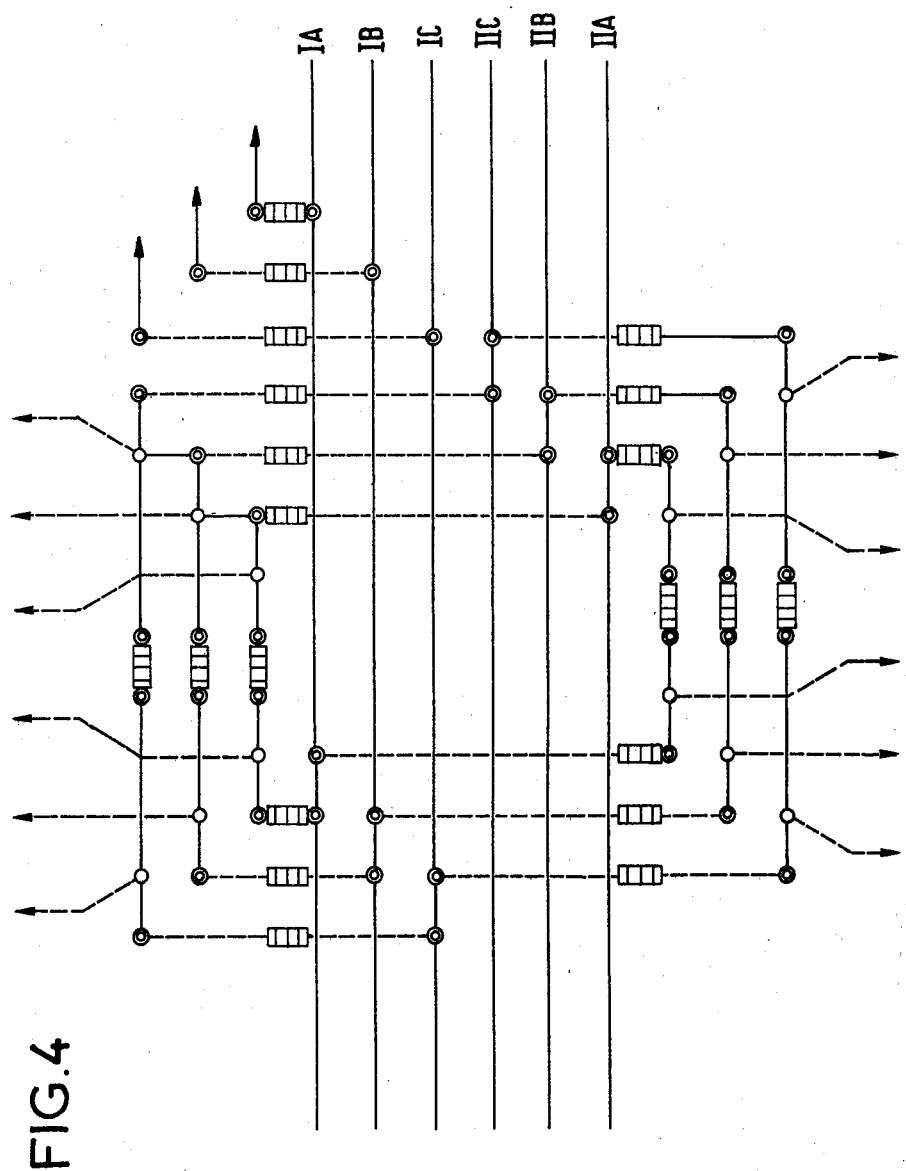
FIG. 4 is a schematic view of an electric power substation according to the invention with two sets of busbars connected by two branch connections each of which comprises three series-connected three-phase circuit-breakers and two line outlets.

FIG. 4 shows a substation of the "one and a half circuit-breaker" type. The busbars at the higher level are in the order $I_A$, $I_B$, $I_C$, $II_C$, $II_B$, $II_A$ and are parallel to one another. Between the two sets of busbars are two symetrical branch circuits each comprising three series-connected three-phase circuit-breakers, each placed between two isolating switches. In each branch circuit an outlet is provided between the centre circuit-breaker and each end circuit-breaker. Thus there is a total of four outlets with six circuit-breakers. The connections between the centre circuit-breaker and the end circuit-breakers is at the upper level and extends parallel to the sets of busbars. The outlets are at the lower level. Arranging the busbars of set II in the opposite order to those of set I means that two adjacent branch connections may be interleaved without wasting any space.

Figure 5:
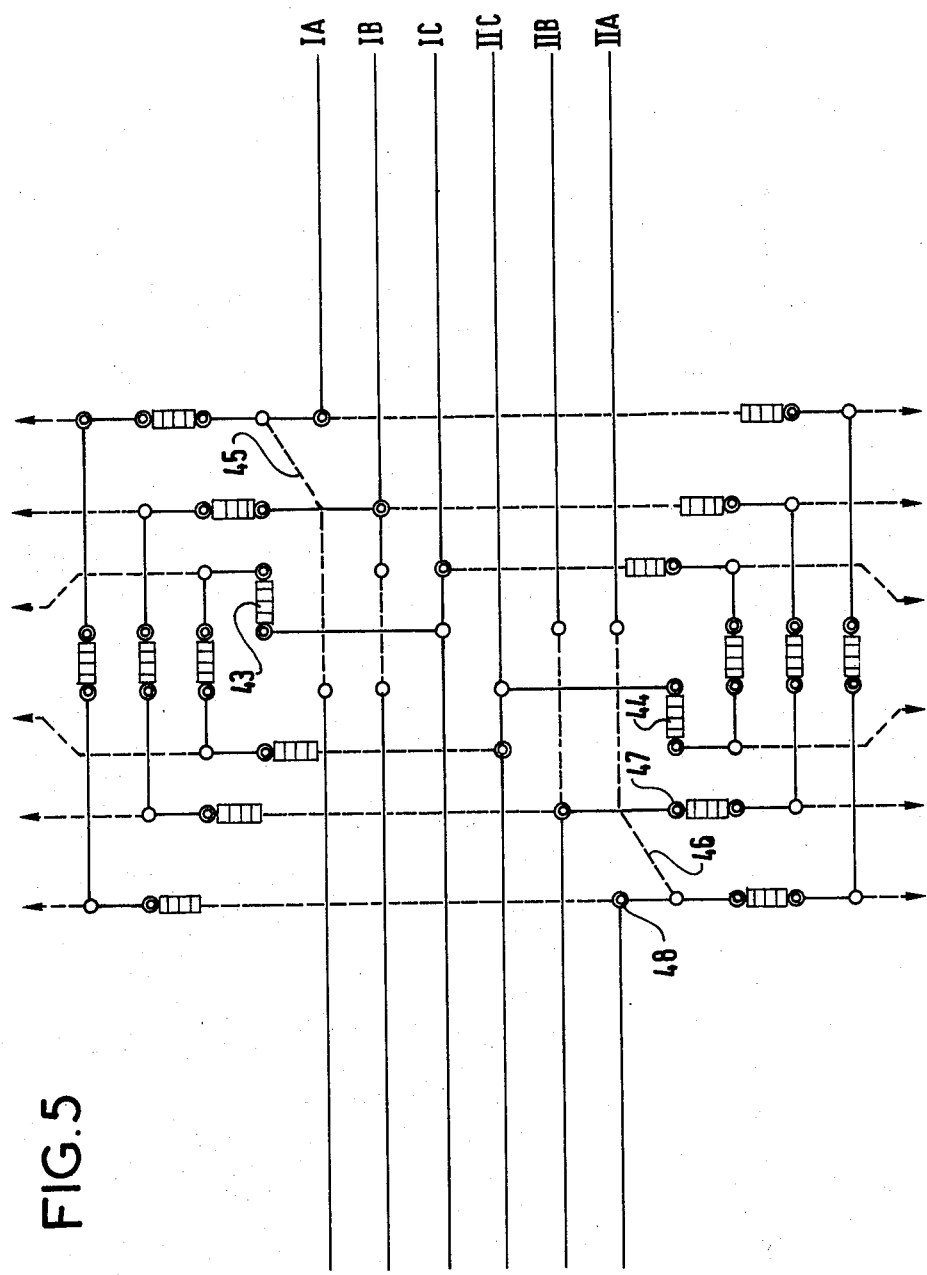
FIG. 5 is a schematic view of an alternative arrangement of the substation shown in FIG. 4.

FIG. 5 shows an alternative version of the substation shown in FIG. 4, with the busbars in the same order. This arrangement differs from that of FIG. 4 in that the central area is put to better use. To this end, the outer conductors of the sets of busbars comprise a section located on the lower level and an end circuit-breaker 43, 44 of each branch circuit is arranged parallel to the busbars, rather than perpendicular thereto. Note that the busbar sections at the lower level feature a connecting conductor (45, 46) which is outwardly inclined relative to the general direction of the busbars. This is to produce the minimum separation required between the lower terminals of the isolating switches 47 and 48 and the connecting conductor 46. As in FIG. 4, the perimeter of phase C of each branch is wholly inside that of phase B which is wholly inside that of phase A. This eliminates the need to cross conductors.

Figure 6:
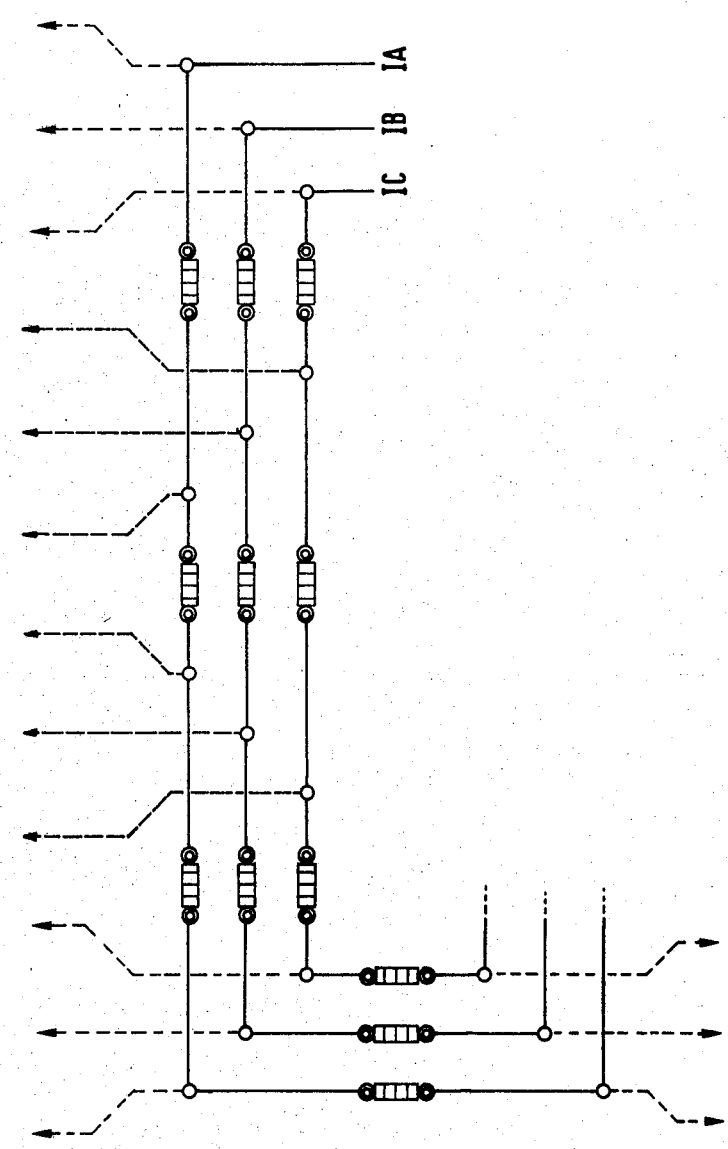
FIG. 6 is a partial schematic view of a loop or ring type electric power substation according to the invention.

FIG. 6 shows a ring or loop type substation comprising a single set of busbars forming a closed loop at the upper level, the line outlets being at the lower level. As in previous arrangements, the perimeter of phase C is wholly within that of phase B which is wholly within that of phase A. This eliminates the need to cross conductors.

I claim:

1. An electric power substation for use at very high voltages of 245 kilovolts and above, comprising at least one circuit-breaker, and at least one conductive busbar, and wherein said circuit-breaker is connected to a conductive busbar by at least one isolating switch whose axis is vertical, the improvement wherein a vertical geometric projection on a horizontal floor plane of the substation of an alive cover of the isolating switch connectable to the very high voltage is within a circle whose diameter is less than thirty percent of an opening distance of the isolating switch and which does not intersect a vertical geometric projection of the circuit-breaker onto a horizontal floor plane of the substation, the isolating switch being for the most part of its axis located above the circuit-breaker so as to provide a region wherein access to the circuit-breaker is protected against the effects of the very high voltage.

2. A substation according to claim 1, wherein the isolating switch is of the telescopic type.

3. A substation according to claim 1, wherein the isolating switch is mounted adjacent the circuit-breaker and is supported with the circuit-breaker on a common framework.

4. A substation according to claim 1, said circuit-breaker is located at a first level above said floor plane, said conductive busbar is located at a second level above said first level, the axis of the circuit-breaker is arranged perpendicular to the busbar with the isolating switch connected to the busbar also connected to the circuit-breaker by means of a connection at said first level.

5. A substation according to claim 1, wherein said at least one busbar comprises two parallel sets of three-phase busbars and two branch connections between said busbars, for each branch connection, said at least one circuit-breaker comprises a center circuit-breaker component and two end circuit-breaker components, each branch connection comprising, connected in series, said center circuit-breaker component and two end circuit-breaker components located at a first level above said floor plane, the busbars being located at a second level above said first level and the connections between each center circuit-breaker component and the associated end circuit-breaker component being at the second level, and wherein the phases of the two sets being in the order: busbar I phases A, B, C, busbar II phases C, B, A.

6. A substation according to claim 1, said at least one busbar comprises two substantially parallel sets of three-phase busbars and two branch connections between said busbars, said at least one circuit-breaker comprising for each branch connection three three-phase circuit-breaker components, each branch connection comprising, connected in series, said three three-phase circuit-breaker components located at a first level above said floor plane, the busbars being located for the most part at a second level above said first level with at least one portion at said first level with a connecting conductor inclined outwardly relative to the general direction of the busbars.

7. A substation according to claim 6, wherein the three circuit-breakers in each branch connection comprise a central circuit-breaker and two end circuit-breakers, one phase in each branch connection comprising a single-phase end circuit-breaker arranged parallel to the general direction of the busbars.

8. A substation according to claim 1, wherein said at least one busbar comprises a single set of busbars forming a closed loop.

9. A substation according to claim 5 or claim 7, wherein the perimeter of the components of a first phase of at least one branch connection lies wholly within the perimeter of the components of a second phase of that branch connection, which lies wholly within the perimeter of the components of the third phase of that branch connection.

10. A substation according to claim 8, characterised in that the perimeter of the components of a first phase of the set busbars lies wholly within the perimeter of the components of a second phase thereof which lies wholly within the perimeter of the components of the third phase thereof.

* * * * *